United States Patent Office 3,492,337
Patented Jan. 27, 1970

---

3,492,337
PROCESS FOR THE PREPARATION OF ALKYL 4-KETOALKANOATES
Edward J. Watson and Dale H. La Bar, West Chester, Pa., assignors to American Home Products Corporation, New York, N.Y., a corporation of Delaware
No Drawing. Filed Sept. 13, 1967, Ser. No. 667,377
Int. Cl. C07c 69/66
U.S. Cl. 260—483         4 Claims

---

ABSTRACT OF THE DISCLOSURE

Alkyl 4-ketoalkanoates, useful as intermediates for estrone and estradiol, are obtained substantially free of hydrolysis products, by an improved means which comprises forming an aci-nitro salt of the corresponding alkyl 4-nitroalkanoate in an alcoholic medium and treating the salt with a strong mineral acid, also in an alcoholic medium.

---

This invention is concerned with the preparation of useful organic compounds. More particularly, it relates to an improved means for the preparation of alkyl 4-ketoalkanoates, without concomitant hydrolysis of the carboalkoxy group, which comprises forming an alkali metal salt of the aci-form of an alkyl 4-nitroalkanoate in an alcoholic medium then converting said salt to said alkyl 4-ketoalkanoate by treatment with a strong mineral acid in an alcoholic medium.

BACKGROUND OF THE INVENTION

Alkyl 4-ketoalkanoates have a variety of commercially important uses; for example, as intermediates for organic syntheses. Methyl levulinate can be converted by hydrolysis to levulinic acid which, in turn, is used industrially in the manufacture of nylon, synthetic rubbers, plastics and medicinals. Methyl 4-ketohexanoate, another such compound can, for example, by cyclized to provide 2-methylcyclopentane-1,3-dione. This latter compound and its 2-polycarbonalkyl homologs, such as 2-ethylcyclopentane-1,3-dione, prepared from methyl 4-ketoheptanoate, are of substantial importance in the preparation of therapeutically-active-totally-synthetic steroids such as estrone, estradiol, 19-nortestosterone and the like by methods outlined, for example, by Gordon Alan Hughes and Herchel Smith in U.S. 3,202,686. Until now the particular alkyl 4-ketoalkanoates with which the present invention is concerned have been made by reaction of a secondary nitroparaffin with aqueous sodium hydroxide yielding the sodium salt of the corresponding aci-nitro compound, which is treated (without isolation) with strong mineral acids to give ketones (H. B. Haas and E. F. Filey, Chem. Revs. 32, 398 (1943)). When this procedure, known as the Nef reaction, is applied to esters of nitroalkanoic acids, the ester group is hydrolyzed during the reaction resulting in the formation of ketoalkanoic acids (C. Kimura, Yuki Gosei Kagaku Kyokaish, 19, 57–60 (1961)). Thus, it is necessary to re-esterify the nitro-alkanoic acid if an alkanoate ester is desired. It would be desirable to provide a means to provide compounds in the Nef reaction wherein the ester group will survive the reaction conditions. However, although the Nef reaction was first reported many years ago, in 1894, and has been used extensively since, no examples have been found in which this reaction has been carried out using solvents other than water. Thus, there is a clearly felt need to provide an improved means for the preparation of alkyl 4-ketoalkanoates, without concomitant hydrolysis, in a solvent medium comprising a solvent other than water used universally heretofore, and such a means is the subject of the instant invention.

It is, therefore, a primary object of the instant invention to provide alkyl 4-ketoalkanoates in good yield, in excellent purity, and in relatively short reaction times.

It is a further object of the instant invention to provide an improved process for the preparation of alkyl 4-ketoalkanoates by conducting a Nef reaction on the corresponding alkyl 4-nitroalkanoate, without concomitant hydrolysis of the carbalkoxy group.

Still another object is to provide alkyl 4-ketoalkanoates by treating an alkyl 4-nitroalkanoate with an alkali metal alkoxide or hydroxide then with a strong mineral acid in a substantially water-free medium.

DESCRIPTION OF THE INVENTION

These and other objects readily apparent to those skilled in the art are easily achieved by practice of the means of the instant invention which is, in essence: a process for the preparation of an alkyl 4-ketoalkanoate of the formula

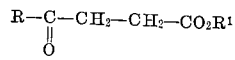

wherein R is alkyl of from about 1 to about 10 carbon atoms and
$R^1$ is alkyl of from about 1 to about 3 carbon atoms, which comprises (A) Contacting an alkyl 4-nitroalkanoate of the formula

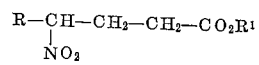

wherein R and $R^1$ are as above defined with a stoichiometrically-equivalent amount of an alkali metal hydroxide or alkoxide of the formula $MOR^2$, wherein M is lithium, sodium or potassium and
$R^2$ is hydrogen or the same as $R^1$ hereinabove defined, in a solvent medium consisting of an alcohol of the formula $R^1OH$, wherein $R^1$ is as above defined until formation of a salt of the aci-form of said nitroalkanoate of the formula

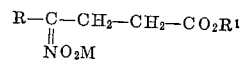

wherein M, R and $R^1$ are as above defined, is substantially complete, and (B) Treating said aci-form of said nitroalkanoate with a stoichiometrically-equivalent amount of a strong mineral acid in said alcohol of the formula $R^1OH$, wherein $R^1$ is as above defined until formation of said alkyl 4-ketoalkanoate is substantially complete and (C) Recovering said alkyl 4-ketoalkanoate.

Also contemplated as a preferred embodiment is the process above defined wherein step (A) is carried out at a temperature of from about 0° C. to about the reflux temperature of the medium at atmospheric pressure; and step (B) is carried out at a temperature of from about 0° C. to about 25° C.

Special mention is made of one particularly valuable embodiment which is a process as first above defined wherein methyl 4-ketohexanoate is prepared by (A) contacting methyl 4-nitrohexanoate with sodium methoxide in a methanol medium at about 25° C. and (B) treating the sodium salt of the aci-form of methyl 4-nitrohexanoate with hydrogen chloride in methanol at a temperature of from about 0° C. to about 5° C. until formation of said methyl 4-ketohexanoate is substantially complete and (C) recovering said methyl 4-ketohexanoate by distillation at reduced pressure. This provides the above-mentioned valuable intermediate for 2-methylcyclopentane-1,3-dione.

Another valuable embodiment is a process as first above defined wherein methyl 4-ketoheptanoate is prepared by (A) contacting methyl 4-nitroheptanoate with sodium methoxide in methanol medium at about 25° C. and (B) treating the sodium salt of the aci-form of methyl 4-nitroheptanoate with hydrogen chloride in methanol at a temperature of from about 0° C. to about 5° C. until formation of said methyl 4-ketoheptanoate is substantially complete and (C) recovering said methyl 4-ketoheptanoate by distillation at reduced pressure. This provides the above-mentioned valuable intermediate for 2-ethylcyclopentane-1,3-dione.

When used herein and in the appended claims, the term "alkyl" contemplates straight and branched chain hydrocarbon radicals containing from about 1 to about 3 (or about 10, as the case may be) carbon atoms. Illustrative of the alkyl groups thus are methyl, ethyl, propyl (n and i), butyl (n, i, sec., and tert.), n-pentyl, n-hexyl, n-heptyl, n-octyl, 2-ethylhexyl, n-nonyl, n-decyl and the like.

The term "strong mineral acid" contemplates inorganic acids such as hydrochloric, sulfuric, phosphoric, nitric, and the like commonly used in Nef reactions. Especially suitable in the instant process is hydrochloric acid.

The alkyl 4-nitroalkanoates used as starting materials in the instant process are readily available or can be easily prepared by techniques known to those skilled in the art. For example, the paper by Kimura, cited above, discloses a useful technique involving base catalyzed condensation of a nitro alkane with an acrylate. In addition, the copending application of E. J. Watson and J. D. Johnston, Ser. No. 621,439, filed Mar. 8, 1967, discloses a uniquely useful means to prepare alkyl 4-nitroalkanoates using basic ion exchange resin catalysts.

As will be noted from a consideration of the foregoing, the reaction is applicable to methyl, ethyl, n-propyl and i-propyl esters of 4-nitroalkanoic acid. Higher esters do not appear to work well, probably because of insolubility of the alkali metal salt of the aci-nitro compound in the alcoholic medium. To avoid interchange of the alkoxy portion of the ester, this portion should, of course, correspond to the solvent used. For example, methanol only is suitable as a solvent for methyl esters of nitroalkanoic acids if the corresponding methyl 4-ketoalkanoate is desired.

The temperature of the reaction is not particularly critical. For example, good yields of product are obtained in relatively short times at a temperature range in step (A) of from about 0° C. to about reflux temperature, conveniently from about 15° C. to about 35° C. and especially at about 22° C. and at a temperature range in step (B) of from about 0° C. to about 25° C., conveniently at from about 0° C. to about 5° C.

In one manner of carrying out the instant process the alkyl 4-nitroalkanoate is added to a solution of a stoichiometrically-equivalent amount of alkali metal alkoxide in about 12 parts by volume of the desired alcohol (based on weight of the alkoxide at about 22° C. A solution of the stoichiometrically-equivalent amount of strong mineral acid in about 9 parts by volume of alcohol (based on the weight of the alkoxide) is cooled to about 3–5° C. The first solution is added gradually to the second maintaining the temperature of the mixture below about 5° C. by means of external cooling. The reaction is substantially complete two hours after addition is finished. The product can be recovered in any conventional manner. One especially convenient way is to concentrate the mixture to about one-fourth volume and to filter the concentrate. Next, the filtrate is extracted with a solvent, such as benzene, and the solvent extract is washed. Evaporation of the solvent, then distillation of the residue, preferably under reduced pressure, provides the alkyl 4-ketoalkanoate product. Instead of alkali metal alkoxide, it is possible to employ a solution of the stoichiometrically required amount of the base in the form of a concentrated aqueous solution of the hydroxide in alcohol. For example, a 50% aqueous solution of sodium hydroxide when added to methanol provides the required homogeneous reaction medium.

DESCRIPTION OF THE PREFERRED EMBODIMENTS

The following examples illustrate the processes of the instant invention. They are not to be construed to limit the claims in any manner whatsoever.

EXAMPLE I

Methyl 4-nitrohexanoate, 87.6 g. (0.5 mole, prepared by the process of Example 1 of copending application Ser. No. 621,439, filed Mar. 8, 1967), is added to a solution of 28.1 g. (0.52 mole) of powdered sodium methoxide in 350 ml. of anhydrous methanol at 22° C. A solution of 70 g. of concentrated hydrochloric acid in 250 ml. of methanol is cooled to 3–5° C. The first solution gradually is added from an addition funnel to the second solution, with stirring, maintaining the temperature in the reaction flask at or below 5° C. by means of an ice bath. After all of the first solution has been added, the mixture is stirred at 5° C. for 2 hours.

The product is recovered by concentration of the reaction mixture to about one-fourth of its original volume by means of a rotary evaporator, maintaining the temperature of the material at about 22° C. The mixture is filtered and the filtrate is extracted with two 300 ml. portions of benzene. The benzene extracts are combined and washed with two 200 ml. portions of saturated aqueous $NaHCO_3$ solution. Benzene is removed by distillation at atmospheric pressure and the residual material is distilled at reduced pressure to give methyl 4-ketohexanoate, B.P. 88–95° C./11 mm., 35.6 g., 50% yield; and methyl 4-nitrohexanoate, B.P. 37–83° C./0.3 to 0.25 mm., 21.2 g. (24% recovered). On the basis of the methyl 4-nitrohexanoate consumed in the reaction, the yield is 65%.

The procedure is repeated substituting for the sodium methylate an equivalent amount of 50% aqueous sodium hydroxide in methanol. Substantially the same results are obtained.

EXAMPLE II

The procedure of Example I is repeated substituting, respectively, potassium methylate and lithium methylate for the sodium methylate and sulfuric acid for hydrochloric acid. Substantially the same results are obtained.

The procedure of Example I is repeated substituting ethyl 4-nitrohexanoate for methyl 4-nitrohexanoate, sodium ethylate for sodium methylate and ethanol for methanol. There is obtained ethyl 4-ketohexanoate, substantially free of 4-ketohexanoic acid. Similarly use of the n-propyl and the i-propyl ester, sodium n-propylate and sodium i-propylate and n-propanol and i-propanol in the procedure of Example I provides, respectively, the corresponding n-propyl 4-ketohexanoate and i-propyl 4-ketohexanoate.

The procedure of Examiple I is repeated, substituting methyl 4-nitroheptanoate for methyl 4-nitrohexanoate. Methyl 4-ketoheptanoate is obtained in good yield.

EXAMPLE III

The procedures of the foregoing examples are repeated with approximately-substituted starting materials and there are obtained the following alkyl 4-ketoalkanoates:

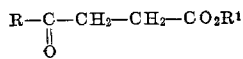

| R: | R$^1$ |
|---|---|
| $CH_3$— | $CH_3$ |
| $(CH_3)_2CH$— | $CH_3$ |
| $CH_3(CH_2)_3CH(CH_2CH_3)$— | $CH_3$ |
| $CH_3(CH_2)_8CH_2$— | $CH_3$ |

What is claimed is:

1. A process for the preparation of an alkyl 4-ketoalkanoate of the formula $$R-\underset{\underset{O}{\|}}{C}-CH_2-CH_2-CO_2R^1$$

wherein R is alkyl of from about 1 to about 10 carbon atoms and $R^1$ is alkyl of from about 1 to about 3 carbon atoms, which comprises (A) contacting an alkyl 4-nitroalkanoate of the formula $$R-\underset{\underset{NO_2}{|}}{CH}-CH_2-CH_2-CO_2R^1$$

wherein R and $R^1$ are as above defined with a stoichiometrically-equivalent amount of an alkali metal alkoxide of the formula $MOR^2$, wherein M is lithium, sodium or potassium and $R^2$ is the same as $R^1$ hereinabove defined, in a substantially water-free solvent medium consisting of an alcohol of the formula $R^1OH$, wherein $R^1$ is as above defined until formation of a salt of the aci-form of said nitroalkanoate of the formula $$R-\underset{\underset{NO_2M}{\|}}{C}-CH_2-CH_2-CO_2R^1$$

wherein M, R and $R^1$ are as above defined, is substantially complete, and (B) Treating said aci-form of said nitroalkanoate with a stoichiometrically-equivalent amount of a strong mineral acid in said substantially water-free alcohol of the formula $R^1OH$, wherein $R^1$ is as above defined until formation of said alkyl 4-ketoalkanoate is substantially complete and (C) recovering said alkyl 4-ketoalkanoate.

2. A process as defined in claim 1 wherein step (A) is carried out at a temperature of from about 0° C. to about the reflux temperature of the medium at atmospheric pressure; and step (B) is carried out at a temperature of from about 0° C. to about 25° C.

3. A process as defined in claim 1 wherein methyl 4-ketohexanoate is prepared by (A) contacting methyl 4-nitrohexanoate with sodium methoxide in a methanol medium at about 25° C. and (B) treating the sodium salt of the aci-form of methyl 4-nitrohexanoate with hydrogen chloride in methanol at a temperature of from about 0° C. to about 5° C. until formation of said methyl 4-ketohexanoate is substantially complete and (C) recovering said methyl 4-ketohexanoate by distillation at reduced pressure.

4. A process as defined in claim 1 wherein methyl 4-ketoheptanoate is prepared by (A) contacting methyl 4-nitroheptanoate with sodium methoxide in methanol medium at about 25° C. and (B) treating the sodium salt of the aci-form of methyl 4-nitroheptanoate with hydrogen chloride in methanol at a temperature of from about 0° C. to about 5° C. until formation of said methyl 4-ketoheptanoate is substantially complete and (C) recovering said methyl 4-ketoheptanoate by distillation at reduced pressure.

References Cited

Chem. Abstracts (Hawthorne) 51:13777–13778 (1957).

Chem. Abstracts (Kimura) 55:5337–5338 (1961).

LORRAINE A. WEINBERGER, Primary Examiner

VIVIAN GARNER, Assistant Examiner

U.S. Cl. X.R.

260—397.3, 397.5, 478, 526, 586